Patented Mar. 13, 1923.

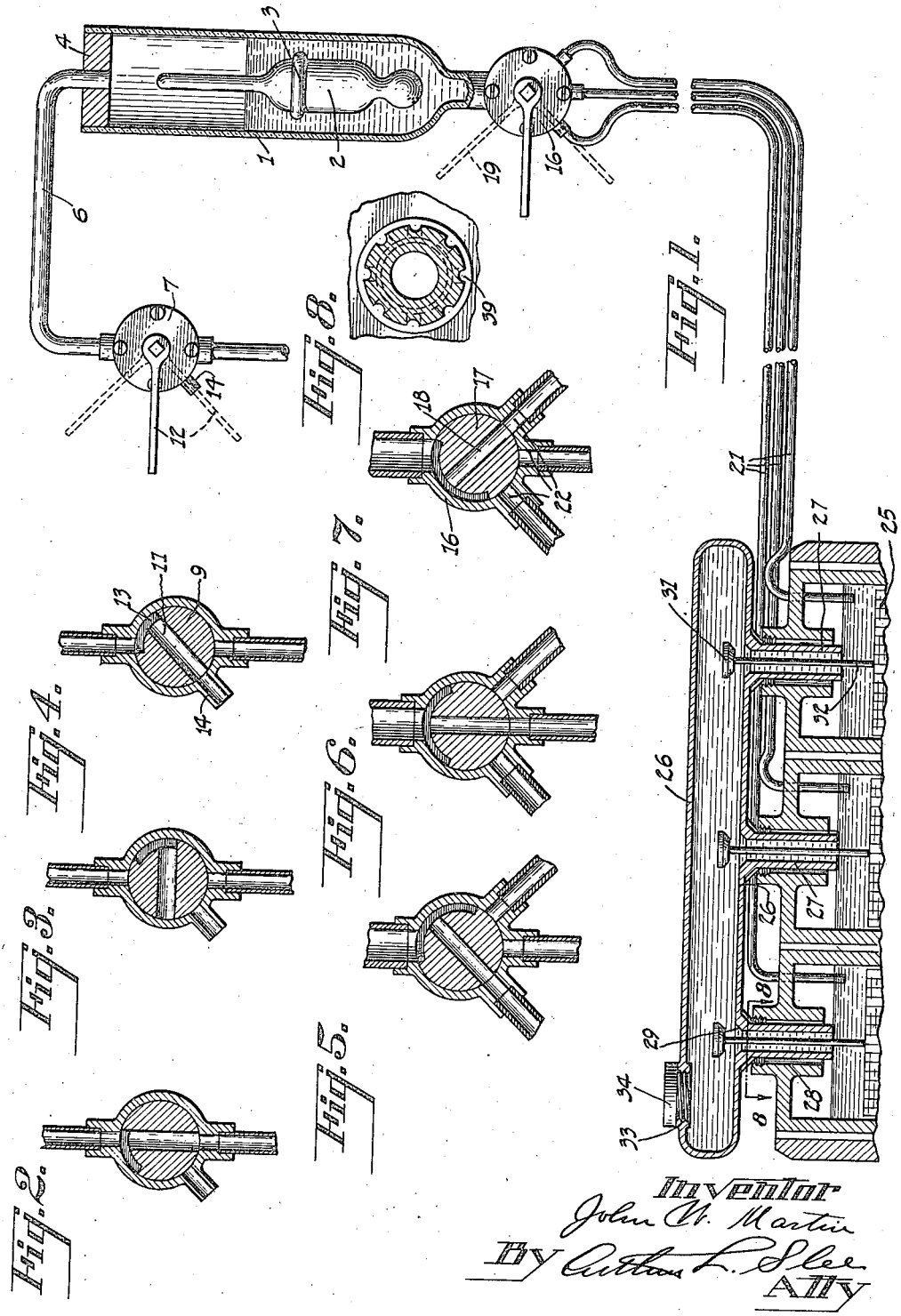

1,448,142

UNITED STATES PATENT OFFICE.

JOHN W. MARTIN, OF SAN ARDO, CALIFORNIA, ASSIGNOR OF ONE-THIRD TO JOSEPH E. FARR, OF SAN ARDO, CALIFORNIA.

BATTERY-TESTING DEVICE.

Application filed January 10, 1922. Serial No. 528,254.

*To all whom it may concern:*

Be it known that I, JOHN W. MARTIN, a citizen of the United States, residing in San Ardo, county of Monterey, and State of California, have invented a new and useful Improvement in a Battery-Testing Device, of which the following is a specification.

My invention relates to improvements in a testing device for storage batteries of motor vehicles and the like wherein suction from the intake manifold of the engine is utilized for drawing solution from the battery into a container provided with a hydrometer for testing the solution of the battery cells.

The primary object of my invention is to provide an improved battery testing device for motor vehicles and the like.

A further object is to provide a device having improved means to facilitate the drawing of solution from a battery cell for testing.

Another object is to provide improved means connecting the cells of a battery with a hydrometer container whereby solution may be drawn independently from any desired cell for testing.

A further object is to provide improved means for automatically maintaining the solution level within the battery above the hydrometer connections thereto to insure the delivery of a full charge of solution to the hydrometer for testing.

Another object of the invention is to provide an improved device having means for withdrawing solution from the cells of a battery by suction from the intake manifold of an internal combustion engine and having provision for the return of the solution to the battery after testing.

A still further object is to provide a device adapted for mounting in connection with the battery and the intake manifold of a motor vehicle whereby the solution may be conveniently tested from the seat of the vehicle.

I accomplish these and other objects by means of the device disclosed in the drawings forming a part of the present specification wherein like characters of reference are used to designate similar parts throughout said specification and drawing, and in which:

Fig. 1 is a vertical section disclosing the general arrangement of my improved battery testing device.

Fig. 2 is a vertical section of the valve connection to the manifold moved to open said connection.

Figs. 3 and 4 are views similar to Fig. 2 showing the valve closed and opened to the atmosphere respectively.

Figs. 5, 6 and 7 are vertical sections of the multiple valve connection between the battery cells and the hydrometer container showing the manner in which the cells may be independently connected.

Fig. 8 is a section taken upon the line 8—8 of Fig. 1 in the direction indicated.

As is well known, the storage battery connected with the ignition and lighting systems of motor vehicles, are ordinarily mounted beneath the front seat or beneath the floor boards of the vehicle. The cells of the battery must be frequently tested to determine the condition of the battery and as the battery is not easily accessible, such testing can be accomplished only with much inconvenience and loss of time. To facilitate the testing of the battery I have provided a container 1 adapted for mounting upon a vehicle, not shown, in any suitable manner preferably upon the dash in a position conveniently accessible to an operator either seated within the vehicle or from the side of the vehicle. Within the container 1 is enclosed a hydrometer 2 of the character commonly used in the testing of battery solutions. The hydrometer is loosely mounted within the container and may be provided with a resilient collar 3 adapted to prevent harsh contact with the sides of the container. The container is made of glass or other transparent material to permit observation of the hydrometer there through.

The upper end of the container 1 is closed by a removable stopper 4 receiving one end of a connection 6, the other end of which is connected to the intake manifold, not shown, in any suitable manner. A two-way valve 7 is mounted in the connection 6, said valve being provided with a rotatable plug 9 having a transverse passage 11 therethrough, said plug being arranged to be turned by a lever 12. One end of the passage 11 communicates with a groove 13 formed in the side of the plug 9. The plug is normally maintained in a closed position as shown in Fig. 3 to close the connection between the container 1 and the manifold, and is arranged to be turned by the lever 12 to an open position with the passage 11 communicating between the adjacent portions of the connection 6 as shown in Fig. 2. The plug 9 is also arranged to be turned to the position shown in Fig. 4 with the connection to the manifold closed and the portion of the connection 6 from the container 1 open to the atmosphere through an opening 14 adjacent the connection 6 and communicating with said connection through the groove 13, the purpose of which will hereinafter be more fully explained.

The lower end of the container 1 is connected to a multiple valve 16 provided with a plug 17 having a transverse passage 18 and arranged to be turned by a lever 19 to communicate with any of a plurality of conduits 21 connected between openings 22 in the valve and the cells 23 of a battery 24. The conduits form separate connections to each of the cells of the battery which may be positioned at any available portion of the vehicle, the ends of the conduits being positioned below the normal solution level of the battery and preferably above the top of the plates 25.

With the device connected as above described, the solution from any one of the cells of the battery may be tested without the necessity of obtaining direct access to the battery in the following manner. The plug 17 of the valve 16 is moved to direct the passage 18 to the opening 22 connected with the desired cell 23, a groove 20 being formed in communication with the end of the passage adjacent the container so that communication may be had with any of the conduits 21 as shown in Figs. 5, 6 and 7 of the drawings. The valve 7 is then operated to open connection between the container 1 and the intake manifold whereby the suction of said manifold will cause a partial vacuum to be formed within the container, said vacuum operating to draw a portion of the solution from the cell 23 upwardly through the conduit 21 connected thereto into the container 1. When sufficient solution has been drawn into the container to float the hydrometer, the valve 7 is again closed and the hydrometer observed through the transparent container 1. To return the solution to its cell after the hydrometer has been observed, the valve 7 is moved to the position shown in Fig. 4 whereby the container connection is opened to the atmosphere, thereby breaking the vacuum in the container and permitting the solution to flow back into the battery. By suitable manipulation of the valves 7 and 16 the cells 23 may thus be tested in turn in the manner above described, and the condition of each cell ascertained.

In order to insure that the surface of the solution will be maintained at a point above the ends of the conduits 21 so that proper manipulation of the valves will cause solution to be drawn into the container 1, I have provided a water receiver 26 formed from any suitable non-conductive material and arranged to automatically maintain the solution level at a predetermined point within the battery. The receiver 26 is preferably made of a size and shape adapted to fit closely upon the top of the battery, said receiver having outlet spouts 27 arranged to extend downwardly into the filling openings 28 of the battery. The inner ends of the spouts 27 are beveled as at 29 to form seats to receive valves 31 loosely mounted within the spouts. Stems 32 extend outwardly from the valves through the spouts to engage the tops of the battery plates 25, so that when the receiver 26 is placed upon the battery as shown in Fig. 1, the stems will engage the tops of the plates and the valves be thereby raised from their seats to permit the passage of water into the battery. The receiver 26 is provided with an opening 33 through which the receiver may be filled, said opening being normally closed by a removable cap 34.

The receiver 26 is removed from the battery for filling, the valves being moved by gravity to close the outlet spouts. After filling the cap 34 is applied to the opening 33 to make an air tight connection and the receiver placed upon the battery, the valves being thereby unseated as above explained. Water will now flow into the cells of the battery until the surface of the solution is raised to the bottom of the spouts, and will automatically keep the surface from dropping below that point as long as any water remains within the container.

The outlet spouts 27 are of a diameter less than the filler openings 33, an enlarged portion 36 being formed to engage the top of the filler opening. Grooves 37 are formed upon the sides of the portion 36 to provide vents for the escape of gas as given off from the battery, as shown in Fig. 8 of the drawings.

By the above arrangement, the battery may be tested with a minimum of inconvenience, and as the receiver 26 will contain sufficient water to keep the cells filled to the proper level for a period of time it is clear that the care of the battery will be greatly facilitated as the receiver will need refilling only at rare intervals. When the suction fails to draw a full charge of solution into the container it will evidence that the receiver is empty and should be refilled, thereby warning the operator before the solution level has fallen below the tops of the battery plates.

From the above description it is clear that my invention is subject to wide variation in construction and manner of attachment. I, therefore, do not restrict myself to the specific construction illustrated but wish to avail myself of all modifications in form, construction and arrangement that will fall within the scope of the appended claims.

Having thus described my invention, what I claim as new and desire to secure by Letters Patent is:

1. In a battery testing device for motor vehicles, the combination with the battery and the intake manifold of a vehicle, of a container mounted upon a vehicle; a hydrometer mounted within the container; a conduit connecting the container with the battery; and means connecting the container with the intake manifold whereby the suction within said manifold will operate to draw solution from the battery into the container whereby said solution may be tested by the hydrometer.

2. In a battery testing device for motor vehicles, the combination with a hydrometer and a container therefor, of means connecting said container with the intake manifold of a vehicle whereby a partial vacuum may be created within the container; and means connecting said container with the battery of the vehicle whereby solution may be drawn from the battery into the container by the vacuum therein to permit testing by the hydrometer within said container.

3. In a battery testing device for motor vehicles, the combination with a hydrometer and a container therefor, of means connecting said container with the intake manifold of a vehicle whereby a partial vacuum may be created within the container; means connecting said container with the battery of the vehicle whereby solution may be drawn from the battery into the container by the vacuum therein to permit testing by the hydrometer within the container; and means for returning said solution to the battery after testing.

4. In a battery testing device for motor vehicles, the combination with a hydrometer and a container therefor, of means connecting said container with the intake manifold of a vehicle whereby a partial vacuum may be formed within said container; and means separately connecting said container with the cells of the battery of the vehicle whereby solution may be drawn from said cells into the container by the vacuum therein to permit testing by the hydrometer within the container.

5. In a battery testing device for motor vehicles, the combination with a hydrometer and a container therefor, of means connecting said container with the intake manifold of a vehicle whereby a partial vacuum may be formed within said container; means connecting said container with each of the cells of the battery of the vehicle whereby solution may be drawn independently from any cell into the container by the vacuum therein to permit independent testing by the hydrometer within said container.

6. In a battery testing device for motor vehicles, the combination with a hydrometer and a container therefor, of means connecting with said container with the intake manifold of a vehicle whereby a partial vacuum may be formed within said container; means connecting said container with each of the cells of the battery of the vehicle whereby solution may be drawn independently from any cell into the container by the vacuum therein to permit independent testing by the hydrometer within said container; and means for returning said solution to its proper cell after testing.

7. In a battery testing device for motor vehicles, the combination with a hydrometer and a container therefor, of means connecting said container with the intake manifold of a motor vehicle whereby a partial vacuum may be formed within the container; a plurality of conduits each connected with a cell of the battery of the vehicle; a multiple valve connecting said conduits to the container whereby solution may be drawn independently from any of said cells into the container by the vacuum therein to permit testing by the hydrometer within the container.

8. In a battery testing device for motor vehicles, the combination with a hydrometer and a container therefor, of a connection mounted between the container and the intake manifold of a vehicle, means connecting said container with the cells of the battery of the vehicle; and a two-way valve mounted in the connection to the manifold, said valve normally closing said connection and being arranged to be moved to open said connection to the manifold whereby a partial vacuum may be formed within the container to draw solution from the cells into said container for testing by the hydrometer therein, said valve being also arranged to be moved to close the connection to the manifold and to open the connection from the container to the atmosphere whereby the solution drawn into said container is returned to the battery after testing.

9. In a battery testing device for motor vehicles, the combination with a hydrometer and a container therefor, of a connection mounted between the container and the intake manifold of a vehicle; a plurality of conduits each connected with a cell of the battery of said vehicle; a multiple valve connecting said conduits with the container whereby any of said conduits may be independently opened to communicate with the container; a two-way valve mounted in the connection to the manifold, said valve normally closing said connection and being arranged to be moved to open said connection to the manifold whereby a partial vacuum may be formed within the container for drawing solution from a desired cell into said container for testing by the hydrometer therein, said valve being also arranged to be moved to close the connection to the manifold and to open the connection from the container to the atmosphere whereby the solution drawn into the container for testing may be returned to the battery.

10. In a battery testing device for motor vehicles, the combination with the storage battery and the intake manifold of a vehicle, of a container mounted upon the vehicle; a hydrometer mounted within the container; connections mounted between the container and the cells of the battery; means for maintaining the solution within the cells above the ends of the connections to said cells; and means connecting the container with the intake manifold whereby a partial vacuum may be formed within the container for drawing solution from the cells into the container for testing by the hydrometer therein.

11. In a battery testing device, for motor vehicles, the combination with the storage battery and the intake manifold of a vehicle, of a container mounted upon said vehicle; a hydrometer mounted within the container; a plurality of conduits each connected with a cell of said battery and opening thereinto below the solution level thereof; means for automatically maintaining the solution level above the conduit connections; a multiple valve connecting said conduit with the container whereby any of said conduits may be independently opened to communicate with the container; a connection mounted between the container and the intake manifold; a two-way valve mounted in said connection to the manifold, said valve normally closing the connection and being arranged to be moved to open said connection to the manifold whereby a partial vacuum may be formed within the container for drawing solution from the desired cell into said container for testing by the hydrometer therein, said valve being also arranged to be moved to close the connection to the manifold and to open the connection from the atmosphere whereby the solution drawn into the container for testing may be returned to the battery.

In witness whereof I hereunto set my signature.

JOHN W. MARTIN.